Jan. 12, 1954     E. V. BUNTING     2,665,622
TRACTOR BORNE AGRICULTURAL IMPLEMENT AND HITCH THEREFOR
Filed June 5, 1946     3 Sheets-Sheet 1
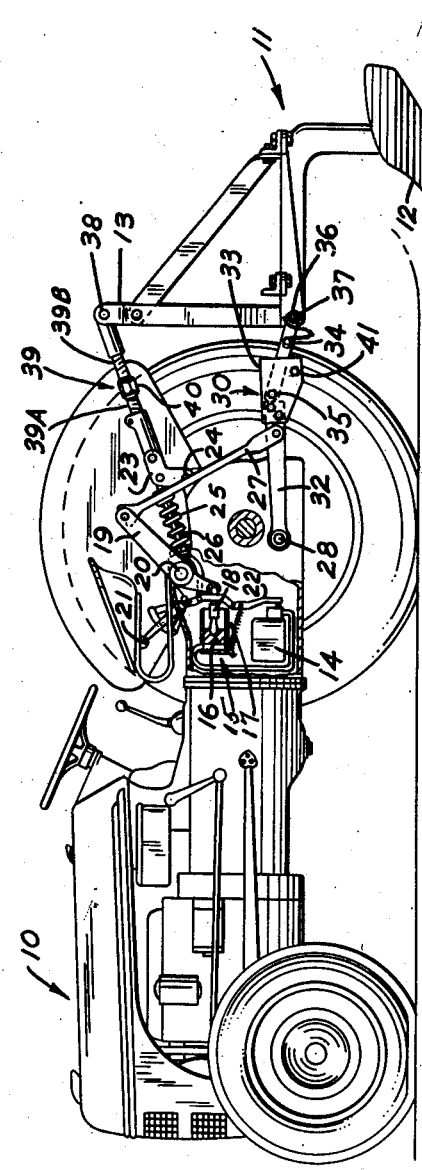
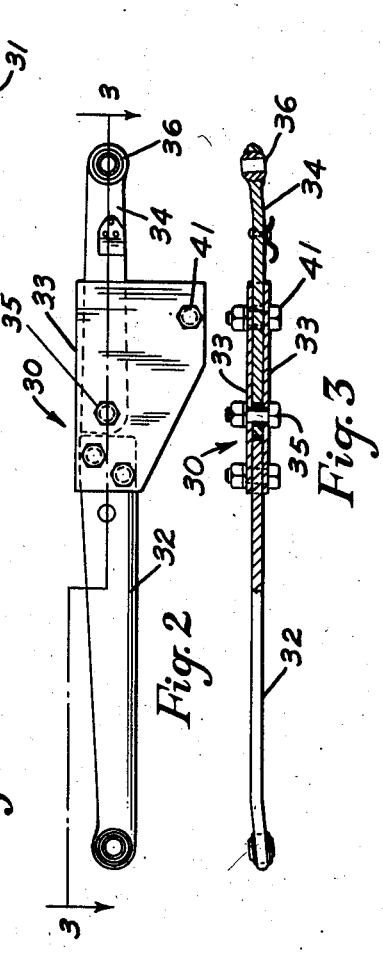
INVENTOR.
ERNEST V. BUNTING
BY
ATTORNEYS Jan. 12, 1954 E. V. BUNTING 2,665,622
TRACTOR BORNE AGRICULTURAL IMPLEMENT AND HITCH THEREFOR
Filed June 5, 1946 3 Sheets-Sheet 2

INVENTOR.
ERNEST V. BUNTING
BY
ATTORNEYS

Jan. 12, 1954     E. V. BUNTING     2,665,622
TRACTOR BORNE AGRICULTURAL IMPLEMENT AND HITCH THEREFOR
Filed June 5, 1946     3 Sheets-Sheet 3

INVENTOR.
ERNEST V. BUNTING

BY Carlson, Pitzner,
Hubbard & Wolfe
ATTORNEYS

Patented Jan. 12, 1954

2,665,622

UNITED STATES PATENT OFFICE 2,665,622

TRACTOR BORNE AGRICULTURAL IMPLEMENT AND HITCH THEREFOR

Ernest V. Bunting, Dearborn, Mich., assignor to Harry Ferguson, Inc., Detroit, Mich., a corporation of Delaware Application June 5, 1946, Serial No. 674,597

10 Claims. (Cl. 97—46.07)

The present invention pertains to tractor borne agricultural implements and hitches for the same.

I aim to provide a novel and improved ground working implement and hitch, for attachment to a tractor equipped with a power lift device having a stress responsive type of automatic control. The tractor disclosed in the well known Henry George Ferguson Patents Nos. 2,118,180 and 2,118,181 will serve as an example of a tractor of the class contemplated. In such a tractor, a pair of draft links are trailingly pivoted on its rear end for connection of an implement to the tractor, the draft links being swung vertically by a hydraulic ram on the tractor. Ground reaction on the implement applies compression to a third or top link extending from the implement to a stress responsive control device for the hydraulic ram so that the ram is caused to raise the draft links, and thus bodily lift the implement, when the ground reaction increases above a predetermined value and conversely to lower the implement bodily when the reaction decreases below such value.

Considering more particularly the objectives of the present invention, it is, on the one hand, my object to make my tractor attachment extremely rugged and of low cost. For that purpose the same is entirely mechanical in construction. In other words, no auxiliary hydraulic cylinders, motors or parts other than simple links, levers and such purely mechanical elements are employed in my attachment. Despite such rigorous limitations of structural simplicity, I aim to perform the following rather intricate and highly desirable operations:

(1) Maintain application of implement load on the traction wheels of the tractor despite extreme relative pitching of tractor and implement in passing over uneven ground, (2) Effect corrective control of implement depth without bodily lifting of the same, and (3) Produce a quick run-in and run-out of the implement.

Further objects and advantages of the invention will become apparent as the following description proceeds taken in connection with the accompanying drawings, in which:

Figure 1 is a side elevation of a tractor equipped with an implement and hitch embodying the present invention, the near rear wheel of the tractor being removed and a portion of its transmission casing being broken away to expose the hydraulic lift mechanism, the latter appearing somewhat diagrammatically.

Fig. 2 is an enlarged side elevation of one of the lower hitch linkages for the apparatus shown in Fig. 1.

Fig. 3 is a sectional view taken substantially along the line 3—3 in Fig. 2.

Figure 4:
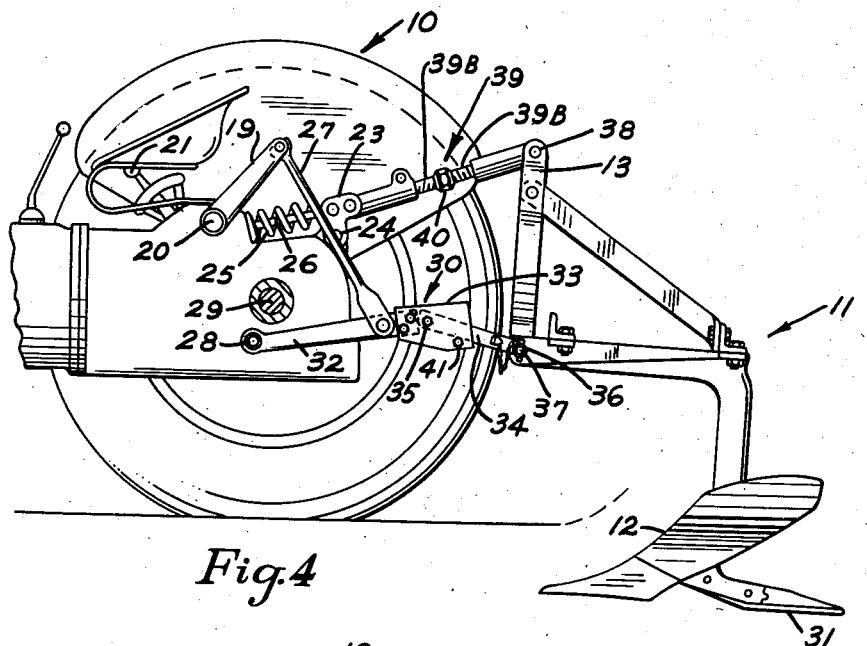
Figs. 4 and 5 show the implement of Fig. 1, but with the plow positioned respectively for running out of the ground and into the ground.

Although certain specific embodiments of the invention have been shown and described herein in some detail, there is no intention to thereby limit the invention to such embodiments, but on the other hand, I intend to cover all modifications and alternative constructions falling within the spirit and scope of the invention as expressed in the appended claims.

Referring more particularly to the installation illustrated in Fig. 1, a tractor 10 is there shown which will be recognized by those skilled in the art as the familiar commercial form of the light agricultural tractor equipped with pneumatic tires and sold under the trade-mark "Ferguson". The tractor embodies a system of implement control well known to those skilled in the art. The construction and operation of such an implement control system is, moreover, disclosed in the Henry George Ferguson Patents 2,118,180 and 2,118,181, referred to above, so that it will not be necessary to describe it here in complete detail. To that tractor I have shown attached an implement 11 including a plow base 12 rigidly connected to a frame or superstructure 13.

For the present, suffice it to note of the implement control system installation on the tractor 10 that: a pump 14 is provided, driven from the tractor engine, which supplies pressure fluid (oil) to a hydraulic ram 15 having a slidable piston 16 and stationary cylinder 17. Outward movement of the piston 16 operates through a rod 18 to rock a pair of crank arms 19 upward about their pivots 20, and similarly retreat of the piston within the cylinder, upon exhaust of fluid from the latter, permits the crank arms 19 to move downward under the gravity load imposed on them by the attached implement and hitch. A quadrant or hand lever 21 operates through a floating lever 22, to shift a main control valve (not shown) which controls the supply of fluid to the pump 14 and exhaust of fluid from the cylinder 17. When the quadrant lever is pulled to its uppermost position fluid is supplied to the cylinder, raising the crank arms 19 to their extreme upwardly inclined or transport position. On the other hand, when the lever 21 is thrust forward fluid is exhausted from the cylinder 17, permitting the crank arms 19 to descend until the implement sustained by the hitch is grounded.

In the present commercial form of the "Ferguson" tractor, an implement is connected to the tractor in such manner that compressive force is applied to a top link during normal working, such compression being derived from ground reaction on the implement, and the compression in the top link tends to rock a shackle 23 forward about its pivot 24 on the upper rear portion of the differential housing. Forward movement of this shackle is resisted by a compression spring 25. As the shackle moves forward a plunger 26 connected to it is also thrust forward to shift the floating lever 22 and thereby operate the main control valve heretofore mentioned, the arrangement, in general, being such that the crank arms 19 are raised or lowered in the direction required to return the implement to that soil depth at which the ground reaction on the implement maintains a predetermined stress on the spring 25 as selected by the setting of the quadrant lever 21. There is thus a stress responsive control for the power lift mechanism.

The present commercial form of the "Ferguson" tractor also includes the crank arms 19 are connected by drop links 27 with a pair of laterally spaced draft links pivoted on the differential housing of the tractor at points 28 located beneath and slightly forward of the rear axle 29. The trailing ends of such draft links are preferably connected by universal pivots with an implement, a third point of connection to the implement being established by way of a pivoted top link connected to the shackle 23 as heretofore noted.

By way of comparison with the implement control system of the present commercial "Ferguson" machine, it will be seen by reference to Fig. 1 that I have provided joints at 30 intermediate the ends of what would otherwise be the usual lower draft links and have also provided a heel slide 31 on the plow base 12 of the implement. By these simple structural alterations I have accomplished a wholly disproportionate change in the operating characteristics of the implement, as will appear more fully in connection with the description of operation below.

As to details of the particular construction shown in Figs. 1 to 5, a pair of draft links are pivoted in parallel laterally spaced relation on the differential housing, one of such links appearing at 32. Rigidly bolted to the trailing ends of these links are pairs of plates 33 between which are pivoted the forward ends of intermediate or connecting links 34 on bolts 35. Ball joints 36 on the trailing ends of the intermediate links 34 are received on laterally projecting pins 37 on the frame 13 of the implement to form universal joint connections with the latter. Each of the draft links 32 and its corresponding intermediate link 34 may, in fact, be formed by simply forming the standard Ferguson lower draft links in two sections pivotally related by the connecting plates as shown. In view of the joints at 30 the draft links 32 and corresponding intermediate links 34 are thus free to jackknife toward and from each other.

The heel slide 31 on the plow base 12 trails behind the forward ground penetrating portion of the latter and presents a downwardly facing flat surface which rides along the bottom of the furrow and forms a fulcrum about which the plow base may be rocked from a normal generally horizontal position in course of operation, as will hereinafter appear.

Pivoted at 38 on the upper portion of the implement frame 13 is a forwardly extending top link 39. In the present instance this top link is of special construction, embodying right and left hand screw sections 39a, 39b, so that its length may be manually adjusted by turning a nut 40. The length of this top link is initially adjusted so that when the plow base 12 is running along in substantially horizontal position, as shown in Fig. 1, at working depth, the joints or knees at 30 will be partially flexed, in other words, the intermediate links 34 will be angled downward slightly with reference to the main draft links 32. Of the particular angle assumed, more will appear below.

Having in mind the particular construction illustrated, attention may now be given to various phases of operation. For transport purposes the quadrant lever 21 is pulled upward so that the crank arms 19 are swung to their extreme upwardly inclined position as heretofore noted. This results in an upward swing of the main draft links 32. The droop of the intermediate links 34 with reference to the main draft links is limited by stops in the form of bolts 41 spanning the gap between the plates 33 so that the entire implement is lifted free of the ground and suspended at the rear of the tractor for rapid transport. The upper position of each link 34 is determined by the limiting abutment of the ends of the link sections 32 and 34.

Presuming that the tractor is moving forwardly at proper working speed, the operator lowers the implement into engagement with the ground simply by thrusting the quadrant lever 21 forward. This opens the valve to exhaust fluid from the ram cylinder 17 so that the crank arms 19 and main draft links 32 are permitted to descend. At this time the intermediate links 34 at their lowermost limits as determined by the stops 41. Upon engagement of the plow with the ground, the whole plow tends to topple forwardly swinging the intermediate links 34 relative to the main links 32 until they are substantially in alignment therewith. (See Fig. 5.) With the plow in this forwardly inclined position, the angle of penetration thereof into the ground is substantially at a maximum so that it will run in very rapidly, thereby advantageously minimizing the distance required to get the plow to working depth. As the plow goes deeper into the soil, the horizontal force which resists the passage of the plow through the soil increases, and since the plow is always seeking to swing rearwardly and upwardly about the pivot point 37, the top link 39 is placed under an increasing compression load. This compression load is opposed by the spring 25, and when this spring is stressed beyond its selected point (as predetermined by the setting of the quadrant lever 21) a consequent movement of the plunger or control rod 26 causes fluid to be supplied to the ram 15 to lift the main draft links 32. The upward movement of these links will be relative to the intermediate links 34 producing somewhat of a "jackknifing" effect and causing the plow bottom (particularly the nose portion thereof) to swing slightly forwardly and upwardly toward its normal level working position. The relative tipping movement of the plow bottom is about the rear end of the heel slide as a center.

As is well known, certain ground working implements (such as the middlebuster shown here) in operation have downward forces acting thereon. These forces, because of the tractor, implement, and hitch relationship inherent in the "Ferguson" machine, are in large measure transferred to the tractor for increasing traction.

The operator as the implement levels off, or subsequently if the character of the soil changes, will adjust the length of the top link 39 (either by shortening or lengthening the link as the case may be) so that when the implement is in its normal running position, i. e., leveled off, at the preselected depth the angle of the intermediate links 34 will be such as to transfer to the tractor the optimum amount of the downward forces for proper traction and implement operation. By way of explanation it will be evident that the least amount of transfer of the downwardly acting forces to the tractor will take place if the lower link connections with the implement are in pure horizontal tension. Conversely, the greatest transfer to the tractor of the downwardly acting forces would occur if the lower link connections to the implement were to be in a pure vertical lift relationship. The entire range of the swinging movement of the intermediate links 34 lies between these two extremes, and normally the optimum amount of weight transfer for any implement will be achieved when the angle of the intermediate links places them between their permitted extremes of movement.

As the implement continues its forward movement at normal running depth, if the horizontal resistance decreases, as for example upon a change in soil texture, the compressive force on the top link 39 will be lessened correspondingly and the plunger 26 thus shifted to bleed fluid from the ram cylinder 17. The main draft links 32 are thus lowered toward the position of Fig. 5. The resultant straightening of the pairs of links 32, 34 topples the implement forward so that it runs deeper.

It should be noted that since the operator has adjusted the length of the upper link to locate the links 34 at an operating angle for optimum weight transfer, the swinging of the links out of this position will affect the amount of weight transferred to the tractor. Thus, when the links 34 swing to straighten with respect to links 32, they move toward the pure tension position, less weight is transferred to the tractor and additional force is available to help the implement go down to depth. As it goes deeper the resistance to horizontal movement is increased and is reflected in a corresponding increase in compression in the top link 39. In this way equilibrium is again finally restored with the plow again righted but at a somewhat deeper level than before. Similarly if the resistance to horizontal movement increases while the plow is running in equilibrium condition the resultant increase in compression on the top link will cause additional fluid to be admitted to the ram, raising the main draft links 32 toward the position of Fig. 4 so that the main and intermediate links 32 and 34, respectively, jackknife toward each other and thus topple the implement rearwardly about the heel slide 31 as a center so that it angles upwardly to run shallower.

This change in the angle of the links 34 is, of course, in the opposite direction to that discussed above with the converse result that added weight is transferred to the tractor with less force holding the implement down. The draft line becomes angled more sharply upwardly which lends its effect to securing a rapid run-out of the implement. Again, as the horizontal resistance to movement decreases with the change in depth of the implement it levels out again in equilibrium condition at the new depth.

At the end of the furrow the operator lifts the implement into transport position simply by swinging the quadrant lever 21 to its upper or "raise" position. Thereupon pressure fluid is admitted to the ram cylinder to raise the main draft links 32 to their fully elevated position. As such links rise they jackknife toward the intermediate links 34 so that the implement is toppled rearwardly and tends to run shallower, quickly emerging from the ground and being lifted to its full transport position with the links 34 against the stops 41.

By way of comparison of operation with the implement control system disclosed in the Ferguson patents identified above, it will be noted that with the arrangement shown and described herein the implement is bodily angled for quick entry into and exit from the ground at the beginning and end of the furrow. Even more significant, it will be noted that change of depth for the implement (in the course of automatically maintaining a predetermined resistance to horizontal movement, or draft load) is accomplished in the present instance by altering the angle of penetration of the implement to cause it to tend to run deeper or shallower, as may be required, as contrasted with the bodily lifting and lowering of the implement in the system of the above-mentioned Ferguson patents. In other words, in the system of these Ferguson patents, the lower draft links are directly connected to the implement and bodily raise and lower it in accordance with changes in resistance to horizontal movement during normal operation. In the present arrangement, on the other hand, since there is no such direct connection, but instead there are interposed freely flexible knee joints at 30, the vertical movement of the main draft links 32 serves to rock the implement bodily in a fore and aft direction, with the heel slide 31 and top link pivot 38 serving as fulcrum or reaction points, rather than to lift and lower the implement bodily.

The contrast of operation with the system of the above-mentioned Ferguson patents is even more marked under certain more or less unusual or abnormal conditions of operation than in the case of plowing on generally level ground as assumed in the preceding description of operation. It will be appreciated by those skilled in the art that much plowed ground is far from level so that provision should be made to accommodate a variety of contours. One particular situation in which the system of the above-mentioned Ferguson patents has heretofore encountered some difficulty is in the event that there is a sudden pitching of the tractor relative to the implement as, for example, when the rear wheels of the tractor drop into a hole or depression. In such case, with the system disclosed in the above-mentioned Ferguson patents, the implement and tractor jackknife toward each other, which may possibly result in a momentary loss of pressure on the fluid in the cylinder 17 and consequent interruption in the transfer of weight from implement to tractor. Such a loss of weight transfer may result in partial loss of traction on the rear wheels of the tractor.

Upon loss of traction and weight transfer the implement will be supported by the earth and the system will not become wholly and normally operative until sufficient fluid has been returned to the main ram to restore the operating condition interrupted when the rear wheels dropped into the depression.

The arrangement herein described serves to minimize the probability of loss of weight transfer and traction upon such relative pitching of the tractor and implement. This is for the reason that with the present arrangement a substantially uniform force is applied to the ram piston 16, by way of reaction from the horizontal resistance to movement of the implement irrespective of any pitching that may take place. Thus in the event that the tractor's rear wheels drop into a depression the tractor and implement will not jackknife toward each other as in the implement control system of the above-mentioned patents, but on the contrary, the lowering of the tractor will tend to straighten out the linkages 32, 34 with a resultant tendency to rock the implement forward so that the piston 16 is retained in contact with the fluid in the cylinder 17 and the transfer of weight from implement to tractor remains substantially uninterrupted, although it may be somewhat diminished, as previously pointed out.

Figure 5:
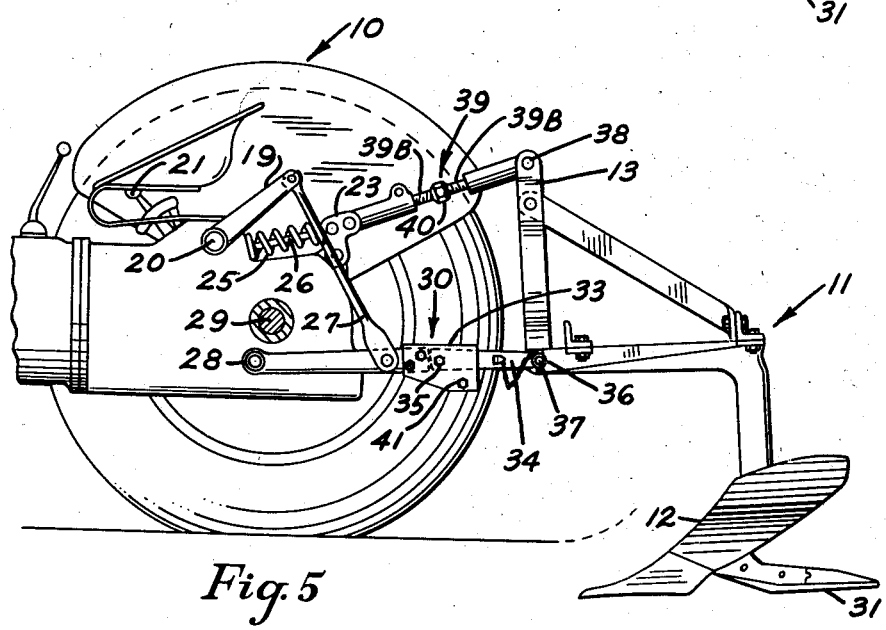

In summary, it will be apparent from Fig. 4 that upward jackknifing of the lower draft elements 32, 34 has the net effect of shortening the tension connection between the pivot 28 on the tractor and the pivot 37 on the implement. Shortening of this draft connection causes the implement to topple rearwardly for quick run-out while lengthening of the draft connection, as illustrated in Fig. 5, causes forward toppling for quick run-in.

From the foregoing it will be perceived that with a structurally simple and very rugged mechanism I have succeeded in very materially enhancing the operating characteristics of the implement control system of the Ferguson patents mentioned above.

Figure 6:
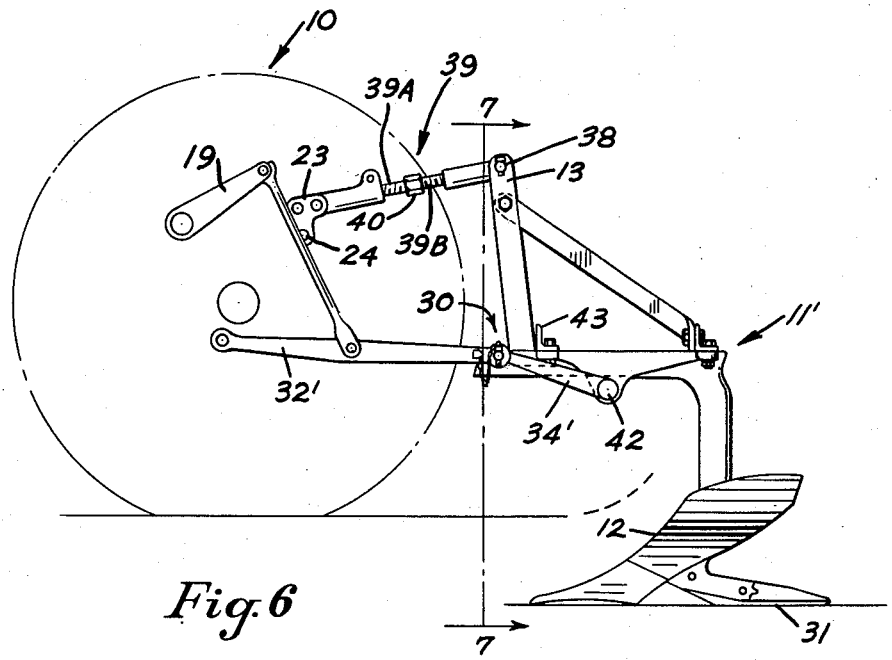
Fig. 6 shows the rear end portion of a tractor like that of Fig. 1 with a modified form of implement and hitch mounted thereon which also embody the present invention, the near rear wheel of the tractor also being removed in this instance to better show the hitch mechanism.

The modified arrangement shown in Fig. 6 is generally similar to that shown in Figs. 1 to 5. It has the advantage, however, that the lower draft links 32' which it employs are the links commonly sold as standard equipment on tractors utilizing the implement control system disclosed in the above mentioned Ferguson patents and consequently does not entail their replacement or reconstruction. Thus in Fig. 6 the implement 11' is connected to the draft links 32' by intermediate links 34', but the latter are arranged for pivotal jackknifing connection to the trailing ends of draft links 32' of full standard length on the tractor. The intermediate links 34' in this case are rigidly fixed to opposite ends of a torsion bar 42 journalled in the implement frame so that they constitute, in effect, crank arms on the end of this bar. This torsion bar arrangement contributes materially to the lateral stability of the implement and is for that reason to be preferred to the arrangement of Figs. 1 to 5. The top link 39 is of the same extensible construction as the top link for the set-up of Figs. 1 to 5.

A reinforcing angle iron 43 extending across the implement frame and rigidly secured to it has projecting ends which serve as abutment stops for the intermediate links or cranks 34' by interception thereof when the implement is hoisted to transport position. The member 43 thus defines one extremity of jackknifing movement of the links 34 about their respective knee joints with the tractor draft links.

Figure 7:
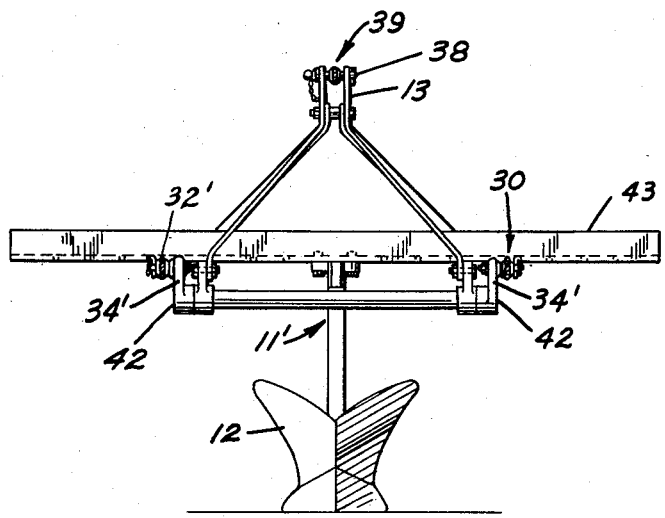
Fig. 7 is a vertical sectional view taken substantially along the line 7—7 in Fig. 6.

So far as general operation is concerned, it is substantially the same for the arrangement of Figs. 6 and 7 as for that of Figs. 1 to 5, and accordingly repetition of detail is unnecessary.

I claim as my invention:

1. For a tractor having a draft link trailingly pivoted on its rear end portion and an automatic draft control for effecting raising and lowering of said link in proportion to the stress applied to a stress responsive element of such control, the combination of an implement having a generally horizontally projecting ground penetrating portion and a rearwardly located surface for supporting the same in the ground, means including a compression link pivotally connected to the upper portion of said implement for applying stress to said control element in accordance with the ground reaction on said implement, and means including a lower tension link pivotally connected to said implement and also adapted for pivotal connection to said draft link for effecting a fore and aft rocking of said implement by jackknifing of said draft link and tension link toward and from each other as an incident to raising and lowering of said draft link.

2. In an attachment for a tractor having a power lift device thereon equipped with an automatic control including a stress responsive element adapted to cause a raising movement of the lift device upon application of a compression load to said element in excess of a predetermined amount, the combination of an implement having a forward ground penetrating portion trailed by a heel slide having a surface thereon for riding along the ground about which the implement rocks to alter its angle of penetration upon being toppled forwardly or rearwardly, a rigid upper compression linkage pivoted to said implement at one end and adapted for connection at its other end to said stress responsive element, a pair of laterally spaced lower tension linkages each having a knee joint intermediate its ends and pivoted at their rear ends to said implement at laterally spaced points thereon located below the point of pivotal attachment of said upper linkage, means on the forward ends of said tension linkages for pivotal attachment of the same to the tractor, and means for connecting said power lift device to said tension linkages at points ahead of the knee joints in the same.

3. In an attachment for a tractor including a draft linkage trailingly pivoted thereon and an automatic lift device carried on the tractor including a stress responsive element adapted to cause a raising movement of the draft linkage upon application of a compression load to said element in excess of a predetermined amount, the combination of an implement having a ground penetrating portion and a surface for riding along the ground and arranged to serve as a pivot about which the implement rocks to alter its angle of penetration upon being toppled forwardly or rearwardly, a rigid upper compression linkage pivoted to said implement at one end and pivoted at its other end to said stress responsive element for applying draft loading thereto, a tension linkage connected to said implement and extending forwardly therefrom for connection to the trailing end of the draft linkage for drawing the implement forwardly, and a pivot connecting said tension linkage to the draft linkage to permit fore and aft rocking of the implement about the supporting surface thereon so that the jackknifing of the linkages brought about by the lift device upon variation in draft causes a corrective change in the angle of penetration for maintenance of constant draft.

4. In an attachment for a tractor having a draft linkage trailingly pivoted thereon and equipped with an automatic lift device including a stress responsive element adapted to cause a raising movement of the draft linkage from a normal running position upon application of a compression load to said element in excess of a predetermined amount, the combination of a plow having a forward ground penetrating portion and a heel portion for riding along the ground and arranged to serve as a pivot about which the plow rocks to alter its angle of penetration upon being toppled forwardly or rearwardly, a rigid upper compression linkage pivoted to said plow at one end and adapted for connection at its other end to said stress responsive element for applying draft load thereto, a tension linkage pivoted to said plow and extending forwardly therefrom for connection to the trailing end of the draft linkage so that upon raising of the latter the tension linkage is jackknifed upwardly relative thereto, said plow being so oriented relative to the linkage that the jackknifing occurring as an incident to an excess draft load being applied to the stress responsive element causes rearward toppling of the plow and quick run-out while a reduction in draft load causes forward toppling and quick run-in for maintenance of constant draft.

5. In an attachment for a tractor including a pair of draft links trailingly pivoted thereon and an automatic lift device carried on the tractor including a stress responsive element adapted to cause a raising movement of the draft links upon application of a compression load to said element in excess of a predetermined amount, the combination of an implement having a ground penetrating portion so arranged that the angle of penetration increases and decreases as the implement is respectively toppled forwardly and rearwardly from the normal position, a rigid upper compression linkage pivoted to said implement at one end, means for pivotally connecting the other end of said upper linkage to said stress responsive element for applying a draft loading thereto, a pair of tension links connected to said implement and extending forwardly therefrom for connection to the trailing ends of the respective draft links for drawing the implement forwardly, and means pivotally connecting said tension links with the draft links to permit relative movement of the implement with respect to the tractor draft links as the tractor wheels pass over bumps and hollows encountered during normal use thereby to prevent temporary loss of control.

6. In an attachment for a tractor having a power lift device thereon equipped with an automatic control including a stress responsive element adapted to cause a raising movement of the lift device upon application of a compression load to said element in excess of a predetermined amount, the combination of an implement having a forward ground penetrating portion trailed by a ground riding portion about which the implement rocks to alter its angle of penetration upon being toppled forwardly or rearwardly, a rigid upper compression linkage pivoted to said implement at one end and adapted for connection at its other end to said stress responsive element, a lower tension linkage having a knee joint intermediate its ends and pivoted at its rear end to said implement at a point thereon located below the point of pivotal attachment of said upper linkage, means on the forward end of said tension linkage for pivotal attachment of the same to the tractor, and means for connecting said power lift device to said tension linkage at a point ahead of the knee joint in the same.

7. In an attachment for a tractor having a draft linkage trailingly pivoted thereon and equipped with an automatic lift device including a stress responsive element adapted to cause a raising movement of the draft linkage from a normal running position upon application of a compression load to said element in excess of a predetermined amount, the combination of an implement having a ground penetrating portion so arranged that the angle of penetration increases and decreases as the implement is respectively toppled forwardly and rearwardly from the normal position, a lower tension linkage pivotally connected at one end to the implement and adapted at the opposite end for pivotal connection to the draft linkage, and upper compression linkage means pivotally connected at one end to the implement at a point above the point of pivotal connection of the tension linkage and adapted for connection at its opposite end to said stress responsive element, the upper compression linkage means including a pair of members connected for endwise adjusting movement for changing the length of the compression linkage to adjust the angle of penetration of the implement.

8. In an attachment for a tractor having a draft linkage trailingly pivoted thereon and equipped with an automatic lift device including a stress responsive element adapted to cause a raising movement of the draft linkage upon application of a compression load to said element in excess of a predetermined amount, the combination of a plow having a forwardly located ground penetrating blade and a rearwardly located ground riding member about which the plow rocks to alter its angle of penetration upon being toppled forwardly or rearwardly, supporting means rigidly carrying the plow having upper pivot means and lower pivot means positioned above the plow, a lower tension link pivotally connected at one end to the lower pivot means and adapted at the opposite end of the link for pivotal connection to the draft linkage, and upper compression linkage means pivotally connected at one end to the upper pivot means and adapted for connection at its other end to said stress responsive element, the upper compression linkage means including a member having screw threads for changing the length of the upper linkage means to adjust the angle of penetration of the plow.

9. For a tractor having a pair of draft links trailingly pivoted on its rear end portion and an automatic draft control for effecting raising and lowering of said links in proportion to the stress applied to a stress responsive element of such control, the combination of an implement having a generally horizontal projecting ground penetrating portion and a rearwardly located surface for supporting the same in the ground, means including a compression link pivotally connected to the upper portion of said implement for applying stress to said control element in accordance with the ground reaction on said implement, a transverse torsion bar journaled on said implement, and means including a pair of lower tension links rigid with said torsion bar and also adapted for pivotal connection to said draft links for effecting a fore and aft rocking of said implement by jackknifing of said draft links and tension links toward and from each other as an incident to raising and lowering of said draft links.

10. In an attachment for a tractor having a power actuated draft linkage trailingly pivoted on its rear end portion and an automatic draft control for effecting raising and lowering of said linkage in proportion to the stress applied to a stress-responsive element of such control, the combination comprising a plow having a forwardly disposed generally horizontal ground penetrating portion and a rearwardly trailing heel portion having a surface for supporting said plow in the ground, a rigid upper compression linkage having its rear end pivoted to the upper portion of said plow, means for pivotally connecting the front end of said upper linkage to the stress-responsive element on the tractor for applying stress to said stress-responsive element in accordance with the ground reaction on said plow, a pair of laterally spaced lower tension links pivoted at their rear ends to said plow at respective laterally spaced points thereon spaced vertically from the point of pivotal attachment of said upper linkage, means for pivotally and trailingly connecting the forward ends of the respective lower tension links to the draft linkage of the tractor to define respective knee joints about which said lower tension links may jackknife under control of the power actuated draft linkage, said lower tension links being adapted upon jackknifing to rock said plow forwardly and rearwardly about said heel portion as a fulcrum and thereby change the angle of penetration of said plow, and means including an abutment on said plow for defining one extremity of jackknifing of said lower tension links by interception thereof.

ERNEST V. BUNTING.

References Cited in the file of this patent

UNITED STATES PATENTS

| Number | Name | Date |
|---|---|---|
| 2,118,181 | Ferguson | May 24, 1938 |
| 2,375,026 | Mott | May 1, 1945 |
| 2,405,980 | Sands et al. | Aug. 20, 1946 |

FOREIGN PATENTS

| Number | Country | Date |
|---|---|---|
| 553,835 | Great Britain | June 8, 1943 |
| 556,859 | Great Britain | Oct. 26, 1943 |